No. 860,946. PATENTED JULY 23, 1907.
A. A. ST. CLAIR.
AIR BRAKE SYSTEM.
APPLICATION FILED SEPT. 29, 1906.
3 SHEETS—SHEET 1.
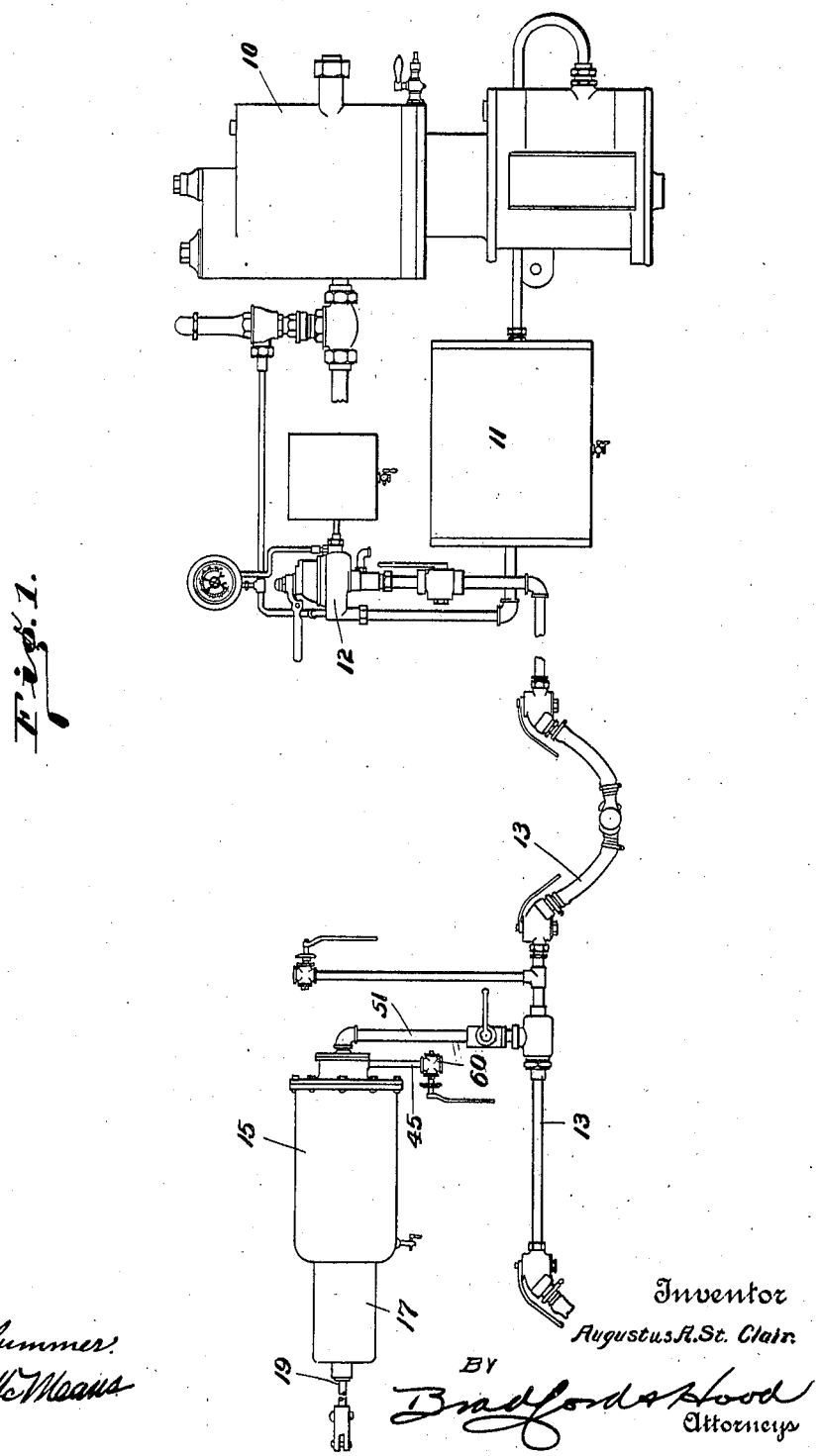

No. 860,946. PATENTED JULY 23, 1907.
A. A. ST. CLAIR.
AIR BRAKE SYSTEM.
APPLICATION FILED SEPT. 29, 1906.
3 SHEETS—SHEET 2.
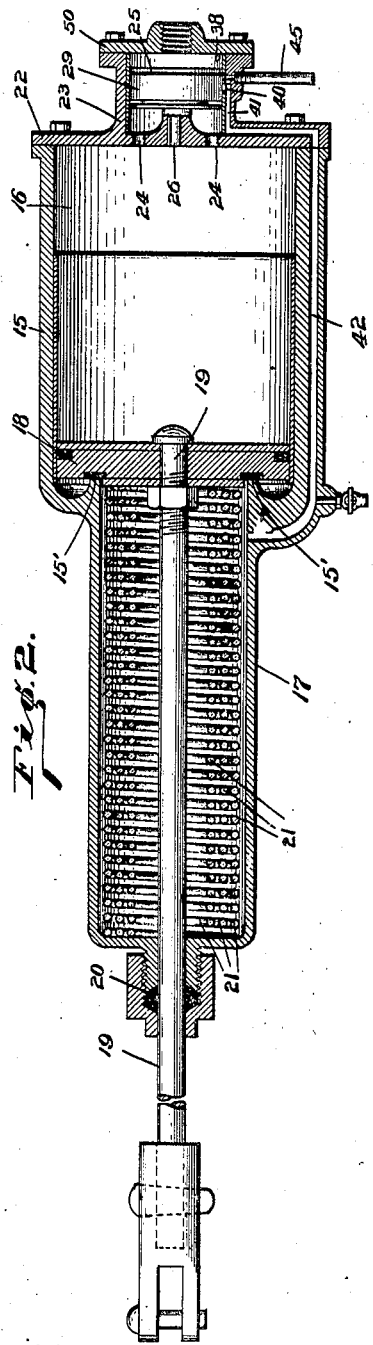
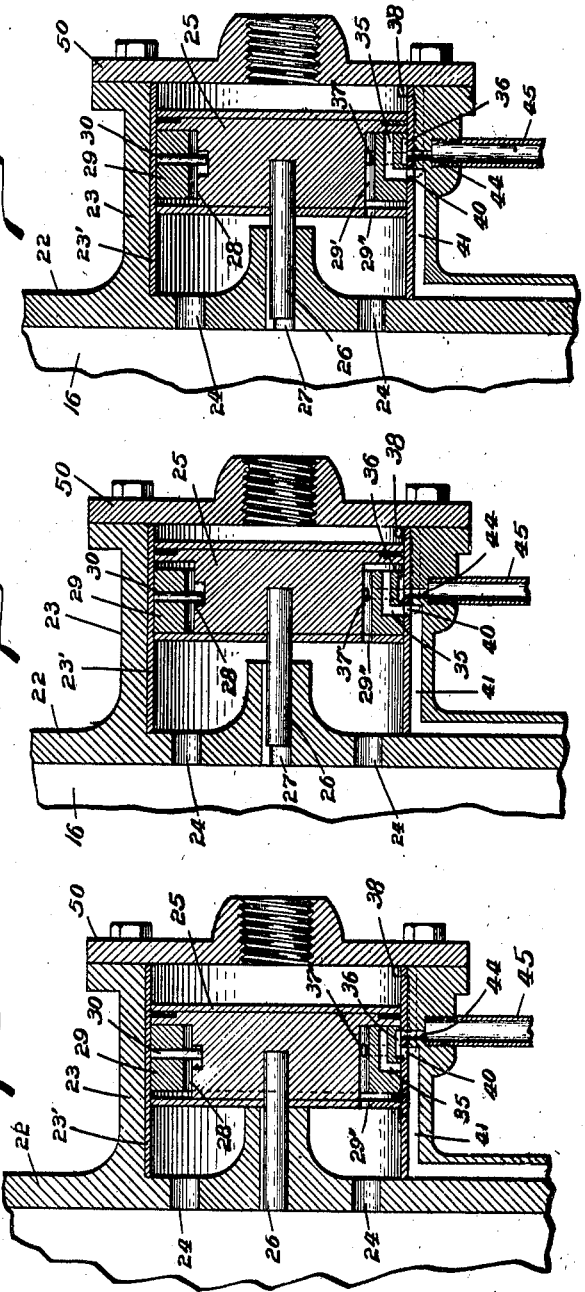
Witnesses
Frank A. Fahle
Thomas H. McMeans
Inventor
Augustus A. St Clair
BY
Bradford Hood.
Attorneys

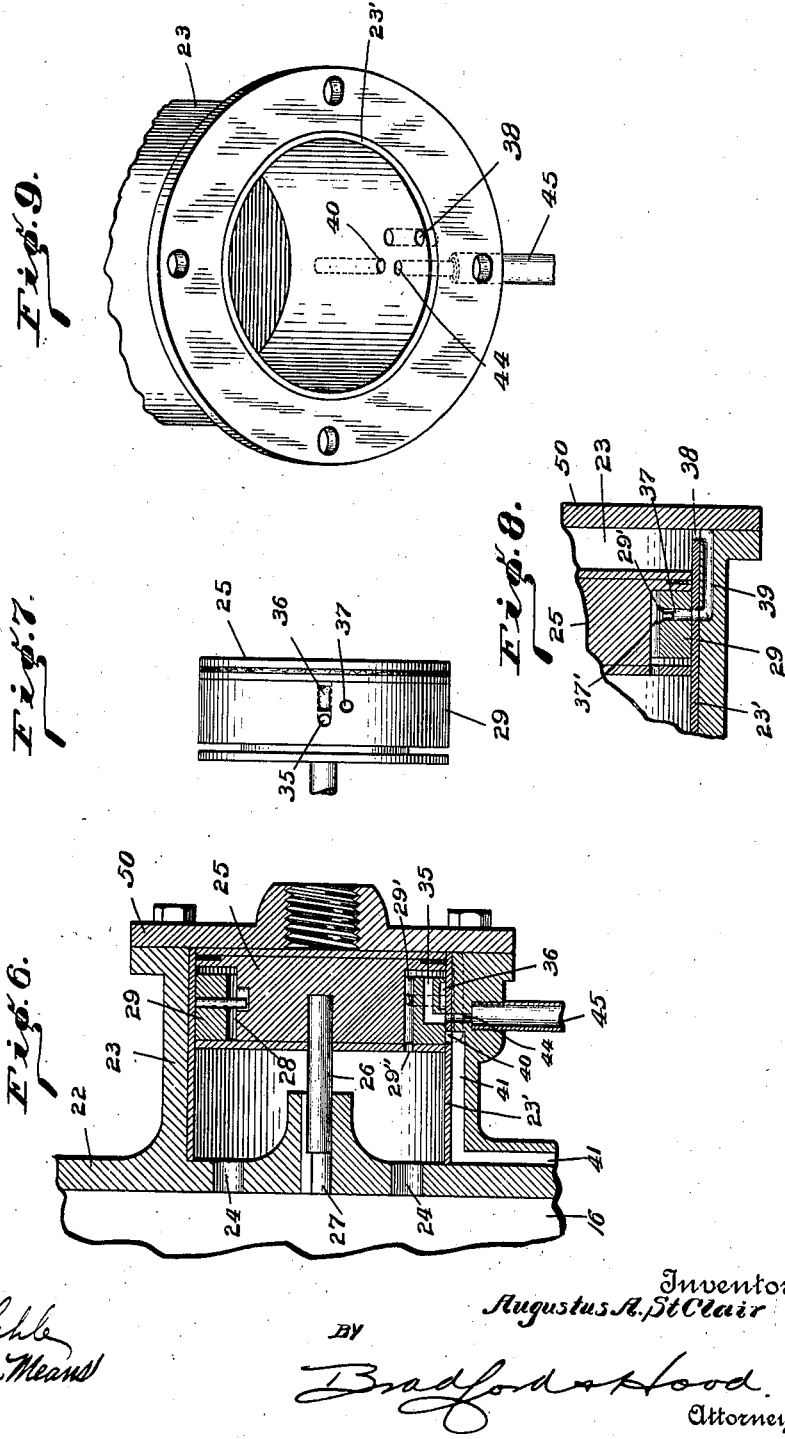

UNITED STATES PATENT OFFICE.

AUGUSTUS A. ST. CLAIR, OF INDIANAPOLIS, INDIANA, ASSIGNOR TO ST. CLAIR AIR BRAKE COMPANY, OF INDIANAPOLIS, INDIANA, A CORPORATION OF INDIANA.

AIR-BRAKE SYSTEM.

No. 860,946.  Specification of Letters Patent.  Patented July 23, 1907.

Application filed September 29, 1906. Serial No. 336,763.

*To all whom it may concern:*

Be it known that I, AUGUSTUS A. ST. CLAIR, a citizen of the United States, residing at Indianapolis, in the county of Marion and State of Indiana, have invented certain new and useful Improvements in Air-Brake Systems, of which the following is a specification.

In the present system of air brakes for cars the brakes are held away from the wheels by a light spring and are urged into engagement with the wheel by air pressure which is furnished under ordinary service conditions, from an auxiliary reservoir and in emergency conditions additional pressure from the train line. With such a system the brakes cannot be set unless the train line and auxiliary reservoirs have been preliminarily charged with a working pressure and if, for any reason, there is a failure of this pressure, the engineer has no control of the brakes and it is necessary to set them by hand. Under most conditions there is no means of notifying the engineer in case there is any lack of working pressure in any or all of the auxiliary reservoirs. The working force for applying the brakes is also limited to below the normal train line pressure.

The object of my invention is to provide an air brake system wherein the normal conditions of the brakes is set so that the train cannot be moved until a satisfactory train line pressure has been attained, the construction being such that if, at any time, there be a failure of this releasing pressure in the train line, there will be an automatic application of brakes throughout the train, and if there be a failure of this releasing pressure on any one of the cars, there will be an application of brakes of that car, thus notifying the engineer automatically of trouble.

A further object of my invention is to so construct my apparatus that it may be worked in series with the present air brake systems.

The accompanying drawings illustrate my invention:

Figure 1 is a diagrammatic view of a system embodying my invention, the only change being a substitution of my improved brake cylinder and automatic valve for the brake cylinder, auxiliary reservoir and triple valve of the present standard system; Fig. 2 is an axial section of my improved brake cylinder and connected valve cylinder, the brake piston and valve being shown in full lines; Fig. 3 is a sectional detail of the valve and adjacent parts in normal running position; Fig. 4 is a similar view showing the parts in service position where the brakes are being held in a given tension; Fig. 5 a similar view showing the valve in service position, the brakes being held under given spring tension; Fig. 6 a similar view showing the valve in extra service position; Fig. 7 a detail of the piston valve and valve ring 90 degrees from the preceding figures. Fig. 8 an axial section through passage 39; Fig. 9 is perspective detail of the valve cylinder adjacent the several ports.

In the drawings, 10 indicates any suitable air compressor, 11 a main reservoir carried by the engine, 12 a suitable engineer's valve, and 13 the train line, all of these parts being of any desired construction, such, for instance, as those now commonly in use. In place of the brake-cylinder, auxiliary reservoir and triple valve, now commonly in use, I substitute the single structure which embodies my invention.

In the drawings, 15 indicates a cylinder having an air chamber 16 and a spring chamber 17, both chambers being air tight, however, and being separated by a tight piston 18 carrying a piston rod 19, which extends through a suitable tight packing gland 20 at the end of the spring chamber. The piston rod 19 is connected to the brake mechanism. Arranged in chamber 17 are springs 21 (one or more, as may be necessary) which engage the piston 18 and tend normally to urge it from the position shown in Fig. 2 toward braking position. In normal running position the piston 18 is held against an annular bearing ring 15′ which positively prevents any leakage around the piston from the air chamber into the spring chamber.

The farther end of the air chamber 16 is closed by a head 22 which carries a valve cylinder 23, the interior of which communicates with chamber 16 through one or more openings 24. Mounted in valve cylinder 23 is a piston valve 25 having a central pin 26 which serves as a guide therefor, said pin being axially movable through opening 27 formed in head 22 and splined therein to prevent turning. Piston valve 25 is provided with a circumferential groove 28 within which is mounted a valve ring 29. The axial length of valve ring 29 is somewhat less than the axial dimension of the groove 28, so that there may be a limited relative axial movement between piston valve and the valve ring and the internal diameter of the valve ring is greater than the diameter at the bottom of groove 28, thus leaving annular space 29′ between the piston valve and the valve ring. An opening 29″ through the inner head of the piston 25 forms a communication with the annular space 29′. In order to prevent the valve ring from turning in the valve cylinder a suitable key 30 may be provided. Formed through valve ring 29 is an L-shaped passage 35, one end emerging from the valve ring in its circumferential surface and the other end emerging from the valve ring at its further end, *i. e.*, the end farthest away from the air chamber 16. Formed in the circumferential face of ring 29 is a passage 36, said passage being merely a recess formed in the circumferential face of the ring. Formed radially through the valve ring is a passage 37 (see dotted lines Figs. 3 to 6 inclusive), one end of which emerges from the external circumferential face of the ring while the other emerges from the internal face of the ring. This passage is provided at its inner end with a check valve 37′. The interior of the valve cylinder 23 is formed by a bushing 23′ of such character that a ground joint may be made with the piston valve and ring 29, and leading through this bushing at its outer end is a port 38, which communicates with a passage 39 formed in the wall of cylinder 23 and extending axially therein, and at its inner end emerging again through bushing 23′ to register with the outer end of passage 37 when the valve ring is in its running position, as shown in Fig. 3.

Formed through bushing 23′ is a port 40 which leads to a passage 41 extending axially in the wall of cylinder 23 and thence radially in head 22 to register with a passage 42 extending axially in the walls of cylinder 15 and opening into the spring chamber 17. An exhaust passage 44 leads through bushing 23′ into an exhaust pipe 45, which leads to the atmosphere. The outer end of valve cylinder 23 is closed by head 50 adapted to receive train line pipe 51.

The operation is as follows: So long as there is no air in the system the piston valve and valve ring will stand in the position shown in full lines in Fig. 6 and the springs 21 will throw piston 18 toward the farther end of chamber 16 and hold the brakes set. The brakes (not shown) may be released by providing hand-operated means by which the piston rod 19 may be turned manually to the position shown in Fig. 2, but as this forms no part of my present invention and consists of an ordinary brake operating shaft and chain, I do not deem it necessary to illustrate the same. Under these conditions the car cannot be moved until proper pressure has been produced in the air brake system. When the air is compressed within the train line it will pass into the valve cylinder 23 and force the piston valve 25 and valve ring 29 to the positions shown in Fig. 3 and the air will pass through port 38, passages 39, 37, 29′ and 29″ and openings 24 into chamber 16, so as to urge piston 18 to the position shown in full lines in Fig. 2, thus compressing springs 21 and releasing brakes. In this position cavity 36 overlaps port 40 and the inner end of passage 44 so as to connect the spring chamber 17 with the atmosphere and both ends of passage 35 are closed. Under these conditions any desired pressure may be produced in the train line and in the cylinder 16. Immediately upon a slight reduction of the train line pressure the pressure within chamber 16 drives piston valve 25 outward, the first movement taking up the slack between the piston valve and the piston ring so as to open one end of passage 35. The piston and ring then move together until passage 37 has been carried out of register with port 39′ (thus closing communication between the train line and chamber 16) and one end of port 35 comes into register with port 40. With the parts in these positions (see Fig. 4) the air in chamber 16 passes through passages 29″, 29′, 35, 40, 41 and 42 into spring chamber 17. This movement of air continuing until the air pressures within chambers 16 and 17 balance, whereupon the train-line pressure moves the piston valve back into return engagement with the valve-ring, as shown in Fig. 5, thus closing one end of passage 35 and thus closing communication between chambers 16 and 17. Under these conditions the brakes will be set with a pressure equal to the difference between the strength of springs 21 and the preponderance of air pressure in chamber 16 over that in chamber 17. By still further decreasing the train-line pressure the piston valve may be caused to again assume the position shown in Fig. 4, whereupon there will be a further flow of air from chamber 16 to chamber 17 and thus bringing into play a further proportion of the force of springs 21. If a braking force greater than the springs is desired the train line pressure is still further reduced, whereupon the piston-valve and piston-ring move to the outer end of their stroke, as shown in Fig. 6, this movement bringing one end of passage 35 into register with the exhaust passage 44, whereupon the pressure within chamber 16 is reduced to atmospheric pressure and the braking force exerted upon piston 18 is equal to the spring pressure plus the air pressure within the spring chamber.

In descending long heavy grades it is desirable that a portion of the brakes remain set at a given amount, while the engineer may operate the remaining brakes more or less as the case may demand. In order to accomplish this result I provide each exhaust pipe 45 with a valve 60 by means of which it may be closed, and the operation thereof is as follows: Upon approaching a long descending grade, a desired number, say every alternate car, of the valves 60 will be closed so that, when air has been once admitted from chamber 16 into chamber 17, it cannot be withdrawn. Under these conditions the brakes on the cars on which the valve 60 is closed, will remain applied after the other brakes have been released in the manner already described, because the air pressure within the chambers 17 cannot be reduced, and, under normal conditions, the brakes on these cars will not be released until the valves 60 have been opened, whereupon the air pressure within chamber 17 may escape and the piston 18 will be forced to release position. If the engineer should desire, however, to release these brakes, he is not dependent upon the services of the brakeman, for, by increasing the train line pressure an amount slightly greater than the air pressure within chamber 17, all of the pistons may be driven back. Under these conditions, if further braking is necessary, the train line pressure will be reduced and all of the brakes will be applied by first reducing the train line pressure to an amount slightly below normal, and then increasing the train line pressure to normal, all of the brakes wherein the valve 60 has not been closed, will be returned to release, while those brakes wherein the valves 60 have been closed, will remain applied. It will be seen by the above that the system is under absolute control of the engineer. It will be also noticed that the apparatus described may be associated with present air brake devices, in series therewith, without in any manner interfering either with its operation or with the operation of the present air brake mechanisms.

It will be noticed that, by using a compression spring or compression springs, to normally urge the brake-operating member to braking position, the possibility of failure of the normally operating braking power, in the absence of proper train-line pressure, is wholly eliminated practically because, even if one of the springs should break at any point in its length, its efficiency would be reduced only by that percent which a single coil of the spring bears to the total number of coils in a spring. So that, with the construction shown in Fig. 2 where there are three springs 21, it would be necessary for every coil of all of the springs to break before the spring would become wholly inoperative. As such an occurrence is manifestly so improbable as to be practically impossible, it will be seen that the compression spring is the proper type of spring or yielding force to use.

I claim as my invention:

1. In a brake system, a brake-operating member, a continuously acting mechanical braking force acting thereon, means for counteracting said force by an opposing pressure, and means for varying said opposing pressure by transferring a portion thereof to act in the same direction as the continuously acting mechanical braking force.

2. In a brake system, a brake-operating member, a continuously acting mechanical braking force acting thereon, means for counteracting said force by an opposing pressure, means for varying said opposing pressure by transferring a portion thereof to act in the same direction as the continuously acting braking force, and means for further reducing the opposing pressure.

3. In a brake system, a brake-operating member, a yielding mechanical means normally urging said member toward braking position, fluid-pressure means for counteracting said means, and means for varying said counteracting fluid pressure by transferring a portion of said fluid pressure to act in the direction of the yielding means.

4. In a brake system, a brake-operating member, a yielding mechanical means normally urging said member toward braking position, fluid-pressure means for counteracting said means, means for varying said counteracting fluid pressure by transferring a portion of said fluid pressure to act in the direction of the yielding means, and means for further reducing the counteracting fluid pressure.

5. In an air-brake system, a brake-operating member, a continuously acting mechanical braking force acting thereon, means for counteracting said force by an opposing air pressure, and means for varying said opposing air pressure by transferring a portion thereof to act in the same direction as the continuously acting braking force.

6. In an air-brake system, a brake-operating member, a continuously acting mechanical braking force acting thereon, means for counteracting said force by an opposing air pressure, means for varying said opposing air pressure by transferring a portion thereof to act in the same direction as the continuously acting braking force, and means for further reducing the opposing air pressure lower than the point of equalization.

7. In an air-brake system, a brake-operating member, a yielding mechanical means normally urging said member toward braking position, air pressure means for counteracting said yielding means, a train line for furnishing said pressure, and means controlled by the train line pressure for varying the counteracting air pressure by transferring a portion of said air pressure to act in the direction of the yielding means.

8. In an air-brake system, a brake-operating member, a yielding mechanical means normally urging said member toward braking position, air pressure means for counteracting said yielding means, a train line for furnishing said pressure, and means controlled by the train line pressure for varying the counteracting air pressure by transferring a portion of said air pressure to act in the direction of the yielding means and also reducing the counteracting air pressure below the point of equalization.

9. In a fluid-pressure brake system, a brake-operating member comprising a cylinder and relatively movable piston arranged therein to form a main pressure chamber and an opposing equalizing chamber, mechanical means for normally urging the brake-operating member to braking position, means for normally maintaining a fluid pressure in the main pressure chamber in opposition to the said yielding means, means for varying said fluid pressure, and means for transferring a portion of the fluid pressure from the main pressure chamber into the equalizing chamber.

10. In a fluid-pressure brake-system, a brake-operating member comprising a cylinder and relatively movable piston arranged therein to form a main pressure chamber and an opposed equalizing chamber, a spring for normally urging the movable member of the brake-operating member to braking position, means for normally maintaining a train-line fluid-pressure, means for varying said train-line pressure, a connection between the train-line and main pressure chamber, and means controlled by the train-line pressure for controlling the pressures within the main pressure chamber and the equalizing chamber.

11. In a fluid-pressure brake-system, a brake-operating member comprising a cylinder and relatively movable piston arranged therein to form a main pressure chamber and an opposed equalizing chamber, means for normally maintaining a train-line fluid-pressure, means for varying said train-line pressure, a connection between the train-line and main pressure chamber, and means controlled by the train-line pressure for controlling the pressures within the main pressure chamber and the equalizing chamber.

12. In a fluid-pressure brake-system, a brake-operating member comprising a cylinder and relatively movable piston arranged therein to form a main pressure chamber, a spring for normally urging the movable member of the brake-operating member to braking position, means for normally maintaining a train-line fluid-pressure, means for varying said train-line pressure, a connection between the train-line and main pressure chamber, and means controlled by the train-line pressure for controlling the pressure within the main pressure chamber.

13. In a fluid-pressure brake system, the combination, of a cylinder, a brake-operating piston mounted therein to form a main pressure chamber and an equalizing chamber, a passage establishing communication between the said two chambers around the piston, a passage establishing communication between each chamber and the atmosphere, and a pressure controlled valve for controlling said passages.

14. In a fluid-pressure brake system, the combination of a cylinder, a brake-operating piston mounted therein to form a main pressure chamber and an equalizing pressure chamber, a valve cylinder communicating with the main pressure chamber and with the equalizing pressure chamber, a piston valve mounted in the valve cylinder, a valve ring carried by said valve and relatively movable axially therein, said valve ring having a passage for establishing communication between the main pressure chamber and the equalizing chamber, a passage for establishing communication between the equalizing chamber and the atmosphere, and a passage for establishing communication between the main pressure chamber and the atmosphere and between the main pressure chamber and the source of fluid pressure.

15. In a fluid-pressure brake system, the combination of a cylinder, a brake-operating piston mounted therein to form a main pressure chamber and an equalizing pressure chamber, a valve cylinder communicating with the main pressure chamber and with the equalizing pressure chamber, a piston valve mounted in the valve cylinder, a valve ring carried by said piston valve and relatively movable axially therein, said valve ring having a passage for establishing communication between the main pressure chamber and the equalizing chamber, a passage for establishing communication between the equalizing chamber and the atmosphere, a passage for establishing communication between the main pressure chamber and the atmosphere and between the main pressure chamber and the source of fluid pressure, and means for closing communication to the atmosphere.

16. In a fluid-pressure brake-system, the combination with a brake-operating member, of means for applying fluid pressure in both directions to said brake operating member, and abnormal means for retaining fluid-pressure acting in the braking direction.

17. In a fluid pressure brake-system, the combination with a brake-operating member, of a spring acting thereon to normally move said member to braking position, and means for applying fluid pressure in both directions to said brake operating member.

18. In a fluid pressure brake-system, the combination with a brake-operating member, of a spring acting thereon to normally move said member to braking position, means for applying fluid pressure in both directions to said brake-operating member, and abnormal means for retaining the fluid pressure acting in the braking direction.

19. In a brake system, a brake-operating member, a compression spring normally urging said member toward braking position, said spring comprising a plurality of compressible portions acting in the same general direction and superimposed whereby a failure of any single portion will only diminish the effectiveness of the spring, means for counteracting said compression spring, and means for varying the counteraction.

20. In a brake system, a brake-operating member, a compression spring normally urging said member toward braking position, said spring comprising a plurality of compressible portions acting in the same general direction and superimposed whereby a failure of any single portion will only diminish the effectiveness of the spring, fluid-pressure means for counteracting said compression spring, and means for varying said counteracting fluid pressure.

21. In a brake system, a brake-operating member, a compression spring normally urging said member toward braking position, fluid-pressure means for counteracting said compression spring, and means for varying said counteracting fluid pressure by transferring a portion of said fluid pressure to act in the direction of the compression spring.

22. In a brake system, a brake-operating member, a compression spring normally urging said member toward braking position, fluid-pressure means for counteracting said compression spring, means for varying said counteracting fluid pressure by transferring a portion of said fluid pressure to act in the direction of the compression spring, and means for further reducing the counteracting fluid-pressure.

23. In a brake system, a brake-operating member, a compression spring normally urging said member toward braking position, said spring comprising a plurality of compressible portions acting in the same general direction and superimposed whereby a failure of any single portion will only diminish the effectiveness of the spring, air pressure means for counteracting said compression spring, and means for varying the air pressure effect on said compression spring.

24. In an air brake-system, a brake-operating member, a compression spring normally urging said member toward braking position, air pressure means for counteracting said compression spring, a train line for furnishing said pressure, and means controlled by the train line pressure for varying the counteracting air pressure.

25. In an air brake-system, a brake-operating member, a compression spring normally urging said member toward braking position, air pressure means for counteracting said compression spring, a train-line for furnishing said pressure, and means controlled by the train-line pressure for varying the counteracting air pressure by transferring a portion of said air pressure to act in the direction of the compression spring.

26. In an air brake-system, a brake-operating member, a compression spring normally urging said member toward braking position, air pressure means for counteracting said compression spring, a train-line for furnishing said pressure, and means controlled by the train-line pressure for varying the counteracting air pressure by transferring a portion of said air pressure to act in the direction of the compression spring and also reducing the counteracting air pressure below the point of equalization.

27. In a fluid-pressure brake-system, a brake-operating member comprising a cylinder and relatively movable piston arranged therein to form a main pressure chamber, a compression spring for normally urging the brake-operating member to braking position, means for maintaining a fluid pressure in the main pressure chamber in opposition to said compression spring, and means for varying said fluid pressure.

28. In a fluid-pressure brake-system, a brake-operating member comprising a cylinder and relatively movable piston arranged therein to form a main pressure chamber and an opposed equalizing chamber, a compression spring for normally urging the brake-operating member to braking position, means for normally maintaining a fluid-pressure in the main pressure chamber in opposition to said compression spring, means for varying said fluid pressure, and means for transferring a portion of the fluid pressure from the main pressure chamber into the equalizing chamber.

29. In a fluid-pressure brake-system, a brake-operating member comprising a cylinder and relatively movable piston arranged therein to form a main pressure chamber and an opposed equalizing chamber, a compression spring for normally urging the movable member of the brake-operating member to braking position, means for normally maintaining a train-line fluid-pressure, means for varying said train-line pressure, a connection between the train-line and main pressure chamber, and means controlled by the train-line pressure for controlling the pressures within the main pressure chamber and the equalizing chamber.

30. In a fluid-pressure brake-system, a brake-operating member comprising a cylinder and relatively movable piston arranged therein to form a main pressure chamber, a compression spring for normally urging the movable member of the brake-operating member to braking position, means for normally maintaining a train-line fluid-pressure, means for varying said train-line pressure, a connection between the train-line and main pressure chamber, and means controlled by the train-line pressure for controlling the pressure within the main pressure chamber.

31. In a fluid pressure brake-system, the combination with a brake-operating member, of a compression spring acting thereon to normally move said member to braking position, and means for applying fluid pressure in both directions to said brake-operating member.

32. In a fluid pressure brake-system, the combination with a brake-operating member, of a compression spring acting thereon to normally move said member to braking position, means for applying fluid pressure in both directions to said brake-operating member, and abnormal means for retaining the fluid pressure acting in the braking direction.

33. In a brake-system, a brake-operating member, a helical compression spring normally urging said member toward braking position, fluid-pressure means for counteracting said compression spring, and means for varying said counteracting fluid pressure by transferring a portion of said fluid-pressure to act in the direction of the compression spring.

34. In a brake-system, a brake-operating member, a helical compression spring normally urging said member toward braking position, fluid-pressure means for counteracting said compression spring, means for varying said counteracting fluid-pressure by transferring a portion of said fluid pressure to act in the direction of the compression spring, and means for further reducing the counteracting fluid-pressure.

35. In an air brake-system, a brake-operating member, a helical compression spring normally urging said member toward braking position, air pressure means for counteracting said compression spring, a train-line for furnishing said pressure, and means controlled by the train line pressure for carrying the counteracting air pressure by transferring a portion of said air pressure to act in the direction of the compression spring.

36. In an air brake-system, a brake-operating member, a helical compression spring normally urging said member toward braking position, air pressure means for counteracting said compression spring, a train-line for furnishing said pressure, and means controlled by the train-line pressure for varying the counteracting air pressure by transferring a portion of said air pressure to act in the direction of the compression spring and also reducing the counteracting air pressure below the point of equalization.

37. In a fluid-pressure brake-system, a brake-operating member comprising a cylinder and relatively movable piston arranged therein to form a main pressure chamber and an opposed equalizing chamber, a helical compression spring for normally urging the brake-operating member to braking position, means for normally maintaining a fluid-pressure in the main pressure chamber in opposition to said compression spring, means for varying said fluid pressure, and means for transferring a portion of the fluid pressure from the main pressure chamber into the equalizing chamber.

38. In a fluid-pressure brake-system, a brake-operating member comprising a cylinder and relatively movable piston arranged therein to form a main pressure chamber and an opposed equalizing chamber, a helical compression spring for normally urging the movable member of the brake-operating member to braking position, means for normally maintaining a train-line fluid-pressure, means for varying said train-line pressure, a connection between the train-line and main pressure chamber, and means controlled by the train-line pressure for controlling the pressures within the main pressure chamber and the equalizing chamber.

39. In a fluid-pressure brake-system, a brake-operating member comprising a cylinder and relatively movable piston arranged therein to form a main pressure chamber, a helical compression spring for normally urging the movable member of the brake-operating member to braking position, means for normally maintaining a train-line fluid-pressure, means for varying said train-line pressure, a connection between the train-line and main pressure chamber, and means controlled by the train-line pressure for controlling the pressure within the main pressure chamber.

40. In a fluid pressure brake-system, the combination with a brake-operating member, of a helical compression spring acting thereon to normally move said member to braking position, and means for applying fluid pressure in both directions to said brake-operating member.

41. In a fluid pressure brake-system, the combination with a brake-operating member, of a helical compression spring acting thereon to normally move said member to braking position, means for applying fluid pressure in both directions to said brake-operating member, and abnormal means for retaining the fluid pressure acting in the braking direction.

42. In a fluid pressure brake-system, the combination with a brake-operating member, of a compression spring acting thereon to normally move said member to braking position, means for applying fluid pressure to said brake-operating member in opposition to said compression spring, means for reducing said fluid pressure, and means for applying fluid pressure to the brake-operating member in the same direction as the compression spring.

43. In a fluid pressure brake-system, the combination with a brake-operating member, of a helical compression spring acting thereon to normally move said member to braking position, means for applying fluid pressure to said brake-operating member in opposition to said compression spring, means for reducing said fluid pressure, and means for applying fluid pressure to the brake-operating member in the same direction as the compression spring.

44. In a fluid pressure brake-system, a brake-operating member, a continuously acting mechanical braking force acting thereon, fluid pressure means for counteracting said force, means for varying said opposing fluid pressure, and means for exerting fluid pressure upon the brake-operating member in the direction of the mechanical braking force.

45. In an air brake-system, a brake-operating member, a continuously acting mechanical braking force acting thereon, means for counteracting said force by an opposing air pressure, means for varying said opposing air pressure, and means for exerting air pressure upon said brake-operating member in the direction of action of the mechanical braking force.

46. In an air brake-system, a brake-operating member, a yielding mechanical means normally urging said member toward braking position, air pressure means for counteracting said yielding mechanical means, a train-line for furnishing said pressure, and means controlled by the train-line pressure for varying the counteracting air pressure and for exerting an air pressure upon the brake operating member in the direction of the mechanical means.

47. In a fluid pressure brake-system, a brake-operating member comprising a cylinder and relatively movable piston arranged therein to form a main pressure chamber and an opposed equalizing chamber, a spring arranged to cause a relative movement thereof toward braking position, means for introducing fluid pressure to counteract said spring with a varying pressure, and means for introducing fluid pressure to act in the direction of said spring.

48. In a fluid pressure brake-system, a brake-operating member comprising a cylinder and relatively movable piston arranged therein to form a main pressure chamber and an opposed equalizing chamber, a compression spring arranged to cause a relative movement thereof toward braking position, means for introducing fluid pressure to counteract said spring with a varying pressure, and means for introducing fluid pressure to act in the direction of said spring.

49. In a fluid pressure brake-system, a brake-operating member comprising a cylinder and relatively movable piston arranged therein to form a main pressure chamber and an opposed equalizing chamber, a helical compression spring arranged to cause a relative movement thereof toward braking position, means for introducing fluid pressure to counteract said spring with a varying pressure, and means for introducing fluid pressure to act in the direction of said spring.

In witness whereof, I, have hereunto set my hand and seal at Indianapolis, Indiana, this 25th day of September, A. D. one thousand nine hundred and six.

AUGUSTUS A. ST. CLAIR. [L. S.]

Witnesses:
FRANK A. FAHLE,
THOMAS W. MCMEANS.